(No Model.)

L. P. WALTER.
INHALER.

No. 556,228.  Patented Mar. 10, 1896.

WITNESSES:
Fred G. Dieterich
P. B. Turpin

INVENTOR
Lyman P. Walter.
BY Munn & Co.
ATTORNEYS.

UNITED STATES PATENT OFFICE.

LYMAN P. WALTER, OF CHICAGO, ILLINOIS.

INHALER.

SPECIFICATION forming part of Letters Patent No. 556,228, dated March 10, 1896.

Application filed March 7, 1894. Serial No. 502,664. (No model.)

*To all whom it may concern:*

Be it known that I, LYMAN P. WALTER, of Chicago, in the county of Cook and State of Illinois, have invented a new and useful Improvement in Inhalers, of which the following is a specification.

My invention is an improvement in inhalers for use in inhaling various medicaments, and the invention has for an object to provide a simple inexpensive device which may be conveniently held or worn in use and which when not in use can be compactly packed, practically nested, into a small space and carried in the vest or other small pocket, and the invention consists in the novel constructions and combinations of parts, as will be hereinafter described and pointed out in the claims.

Figure 1:
Figure 2:
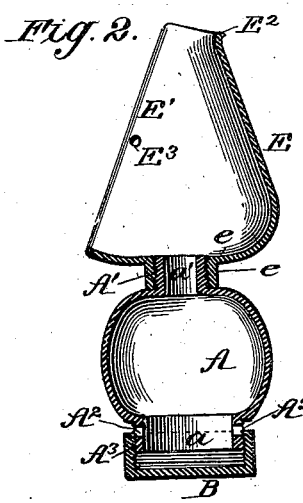
Figure 3:
Figures 4, 5:
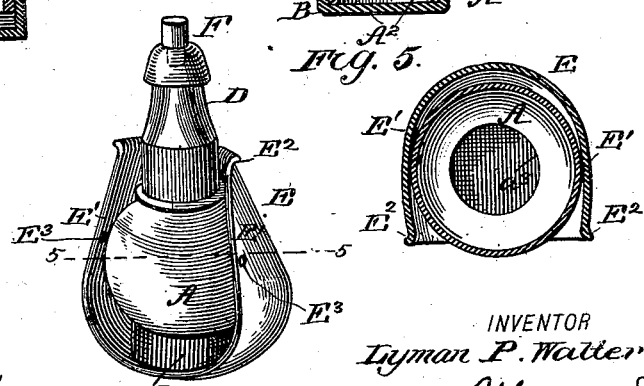

In the drawings, Figure 1 shows the improved device as in use, the inhaler being held upon the nose by strings passed around the head and tied. Fig. 2 is a vertical longitudinal section with the nose-piece applied and showing the screw-cover adjusted to permit the circulation of air through the inhaler. Fig. 3 is a similar view showing the mouth-piece substituted for the nose-piece and the screw-cover in closed position. Fig. 4 shows the parts nested, and Fig. 5 is a cross-sectional view on about line 5 5 of Fig. 4.

The inhaler is composed of the sponge-cup A, screw-cover B, and the discharge-piece, which may be a mouthpiece D, as shown in Fig. 3, but is preferably a nose-piece E, as shown in Fig. 1. These several parts are preferably made of hard rubber, because such material is easily worked into the desired forms, is comparatively cheap and proof against the medicines used, and because it is not cold or harsh to the touch; but manifestly other materials may be used if desired.

The sponge-cup A may be so called for convenience of reference because it is adapted to receive a small piece of sponge to serve as an absorbent for the medicine used; but obviously other material may be used as a carrier for the medicine or the latter in powdered or other suitable form be placed directly in the cup A without any sponge or other absorbent being used.

The cup A has inlet and outlet openings $a$ and $a'$, the former being large and the latter small. These openings $a$ $a'$ are surrounded by threaded nipples $A^3$ $A'$, and the nipple $A^3$ has at or near its inner end a transverse opening or openings $A^2$, and the screw-cover B turned on this nipple A may be adjusted to close or partially close the openings $A^2$, as desired. The discharge-piece is screwed on the nipple $A'$ and may be readily removed to permit the convenient interchange of nose and mouth piece.

The nose-piece E is formed to fit over and under the nose and has the nipple $e$ depending from its bottom $e'$ and fitted to the nipple $A'$ of the sponge-cup. The side plates $E'$ of the piece E are flared or rounded outward at $E^2$ to form a round bearing to rest against the face. In these side plates $E'$ are formed openings $E^3$ for the cords, by which the inhaler may be secured in place. This permits it to be worn at night when the wearer is asleep.

When the device is not in use, the mouth-piece may be applied to the cup and the latter be pressed into the nose-piece, as shown in Fig. 4, the side plates $E'$ of said nose-piece having a spring or elasticity and being so arranged that the forcing of the cup between them will spread them slightly apart, so they will grip and hold the cup. This construction provides for nesting the parts compactly together, so they may be conveniently packed and stored, and especially so the inhaler can be conveniently carried in the pocket.

To prevent evaporation when the device is not in use I employ a small plug F fitted removably in the mouthpiece, as shown in Fig. 4.

Having thus described my invention, what I claim as new, and desire to secure by Letters Patent, is—

1. As an improved article of manufacture, the nose-piece having an open side, to adapt it to receive and fit over the nose, and provided at the bottom with a projecting nipple, and the cup, for holding the medicament, the same having an upwardly-projecting nipple adapted to fit and detachably engage the aforesaid nipple of the nose-piece, as shown and described.

2. The improved inhaler herein described consisting of the cup A and nose-piece E having joints arranged for detachable connection, the said nose-piece being formed with springy side plates between which the cup is fitted and held in the nested position of the parts, all substantially as and for the purposes set forth.

LYMAN P. WALTER.

Witnesses:
P. A. WHITE,
C. W. RAYMOR.